United States Patent
Smaragdis et al.

(10) Patent No.: US 7,583,808 B2
(45) Date of Patent: Sep. 1, 2009

(54) LOCATING AND TRACKING ACOUSTIC SOURCES WITH MICROPHONE ARRAYS

(75) Inventors: Paris Smaragdis, Brookline, MA (US); Petros Boufounos, Boston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1037 days.

(21) Appl. No.: 11/091,027

(22) Filed: Mar. 28, 2005

(65) Prior Publication Data

US 2006/0215849 A1 Sep. 28, 2006

(51) Int. Cl.
*H04R 1/02* (2006.01)

(52) U.S. Cl. ............................ 381/91; 381/92; 381/122; 381/150

(58) Field of Classification Search ................... 381/91, 381/92, 122
See application file for complete search history.

(56) References Cited

U.S. PATENT DOCUMENTS 5,930,202 A * 7/1999 Duckworth et al. ......... 367/127
7,447,635 B1 * 11/2008 Konopka et al. ............ 704/275

OTHER PUBLICATIONS

M.S. Brandstein, J.E. Adcock, and H.F. Silverman, "A practical time delay estimator for localizing speech sources with a microphone array", Computer Speech and Language, vol. 9, pp. 153169, Apr. 1995.
S.T. Birtchfield and D.K. Gillmor, "Fast bayesian acoustic localization", in the proceedings of the International Conference on Acoustics, Speech and Signal Porcessing (ICASSP), 2002.
T. Pham and B.M. Sadler, "Wideband array processing algorithms for acoustic tracking of ground vehicles". US Army Research Laboratory, report. Available in: http://www.arl.army.mil/sedd/acoustics/reports.htm.
Benesty, J. Adaptive eigenvalue decomposition algorithm for passive acoustic source localization, In emphJournal of the Acoustical Society of America, vol. 107, pp. 384-391, Jan. 2000.

* cited by examiner

*Primary Examiner*—Vu Le
*Assistant Examiner*—Daren Vaughn
(74) *Attorney, Agent, or Firm*—Dirk Brinkman; Gene Vinokur

(57) ABSTRACT

A method constructs a location model for locating and tracking sources of acoustic signals. Acoustic training signals are acquired from an acoustic training source at an unknown location in an environment with an array of microphones placed at unknown positions in the environment. From each acoustic training signal, relative acoustic features are extracted to construct a location model that is trained with the relative acoustic features.

8 Claims, 7 Drawing Sheets

200

LOCATING AND TRACKING ACOUSTIC SOURCES WITH MICROPHONE ARRAYS

FIELD OF THE INVENTION

This invention relates generally to acoustic signal processing, and more particularly to locating and tracking acoustic sources with an array of microphones.

BACKGROUND OF THE INVENTION

An array of microphones can be used to locate and track a source of acoustic signals, e.g., a speaker or vehicle. Generally, this is called source localization.

One common method takes advantage of the time difference of arrival (TDOA) of the acoustic signal at the microphones. The TDOA can be estimated using a variety of techniques, "Special issue on time-delay estimation," IEEE Transactions on Acoustics and Speech Signal Processing, vol. ASSP-29, June 1981, M. S. Brandstein, J. E. Adcock, and H. F. Silverman, "A practical time delay estimator for localizing speech sources with a microphone array," Computer Speech and Language, vol. 9, pp. 153-169, April 1995, C. H. Knapp and G. C. Carter, "The generalized correlation method for estimation of time delay," IEEE Transactions of Acoustics and Speech Signal Processing ASSP-24, 320327, 1976, and Benesty, J. "Adaptive eigenvalue decomposition algorithm for passive acoustic source localization," Journal of the Acoustical Society of America, vol. 107, pp. 384-391, January 2000.

In conjunction with the positions of the microphones, the TDOA can be used to estimate the location of the source, R. Schmidt, "A new approach to geometry of range difference location," IEEE Transactions of Aerospace and Electronic Systems, vol. AES-8, pp. 821-835, November 1972, J. Smith and J. Abel, "Closed-form least-squares source location estimation from range-difference measurements," IEEE Transactions on Acoustics and Speech, Signal Processing, vol. ASSP-35, pp. 1661-1669, December 1987, and J. Smith and J. Abel, "The spherical interpolation method for closed-form passive source localization using range difference measurements," Proceedings of the International Conference on Acoustics, Speech and Signal Processing (ICASSP), 1987.

Another method measures a likelihood that the signal originated from a set of locations instead of inferring the location from the input signal. That method can use a wide variety of computational techniques, including beam-forming and/or probabilistic formulations, S. T. Birtchfield and D. K. Gillmor, "Fast Bayesian acoustic localization," Proceedings of the International Conference on Acoustics, Speech and Signal Processing (ICASSP), 2002. Although that method is less efficient than the TDOA method, the method has better performance, and can operate reliably in environments with multiple sources.

Regardless of the localization technique used, it is imperative that the acoustics do not exhibit confusing reflections, the positions of the microphones are known, and the microphones have similar responses. Non-compliance with any of the above conditions can result in detrimental accuracy in localization estimates.

Therefore, it is desired to perform source localization in the case where the positioning and response of the microphones is unknown, where the acoustic environment is unknown, where there are strong reflections, and where there is constant background noise.

SUMMARY OF THE INVENTION

The invention provides a system and method for locating and tracking acoustic sources.

In a first stage, a location model is trained with acoustic signals emanating from acoustic sources at unknown locations. The training can be performed for any number of sources. An array of microphones having different responses acquires the acoustic signals. The microphones are fixed in place at unknown positions.

The response characteristics of each acoustic source are used as training features, and subsequently for locating and tracking new acoustic signals.

Spurious reflections of the signals and microphone inconsistencies do not pose a practical issue because these are 'learned' as part of the training process. The invention is practical for acoustic environment including the fixed array of microphones.

DETAILED DESCRIPTION OF THE PREFERRED EMBODIMENT

Figure 1:
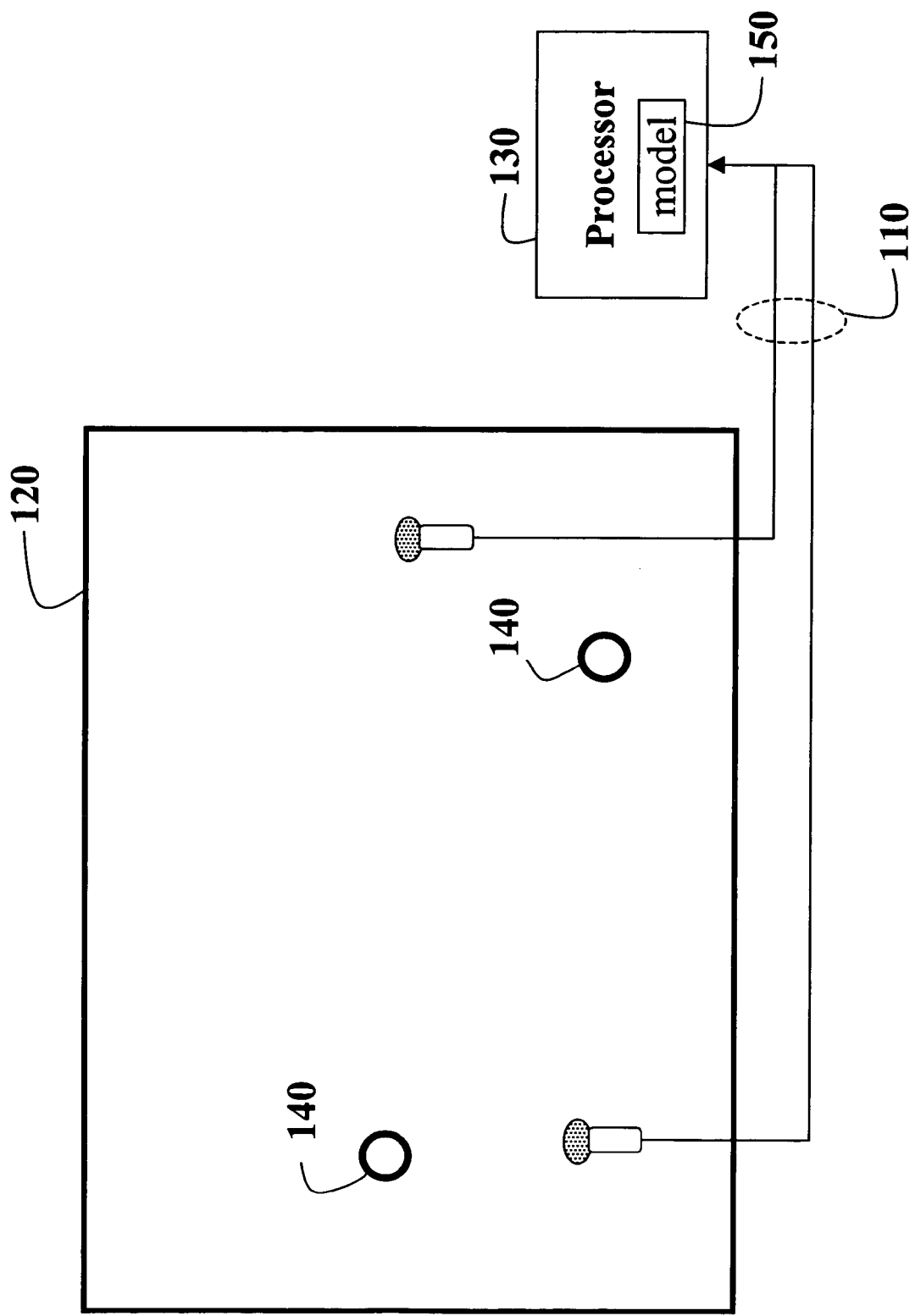
FIG. 1 is a block diagram of a system for locating and tracking acoustic sources according to the invention.

FIG. 1 shows a system for locating and tracking acoustic sources according to our invention. An array of microphones 110 is placed in an acoustic environment 120. The microphones are fixed in place at unknown positions, and the microphones have unknown response characteristics. The microphones are connected to a processor 130. The environment also includes one or more acoustic sources 140 at unknown locations, used for training. The sources can also move along unknown trajectories. The sources produce 'training' signals.

For simplicity, we describe the case where there are two microphones in the array. However, it should be understood that any number of microphones are possible by considering pair-wise microphone combinations.

Location Features

In order to have invariance from the nature of the acoustic source and microphone characteristics, we acquire relative acoustic features. We use the features to train a location model 150. Thus, the training is not influenced by the nature of the inputs, but rather by cross-microphone relations.

The feature set is the relative magnitude and phase of the spectra of each input signal.

Figure 2:
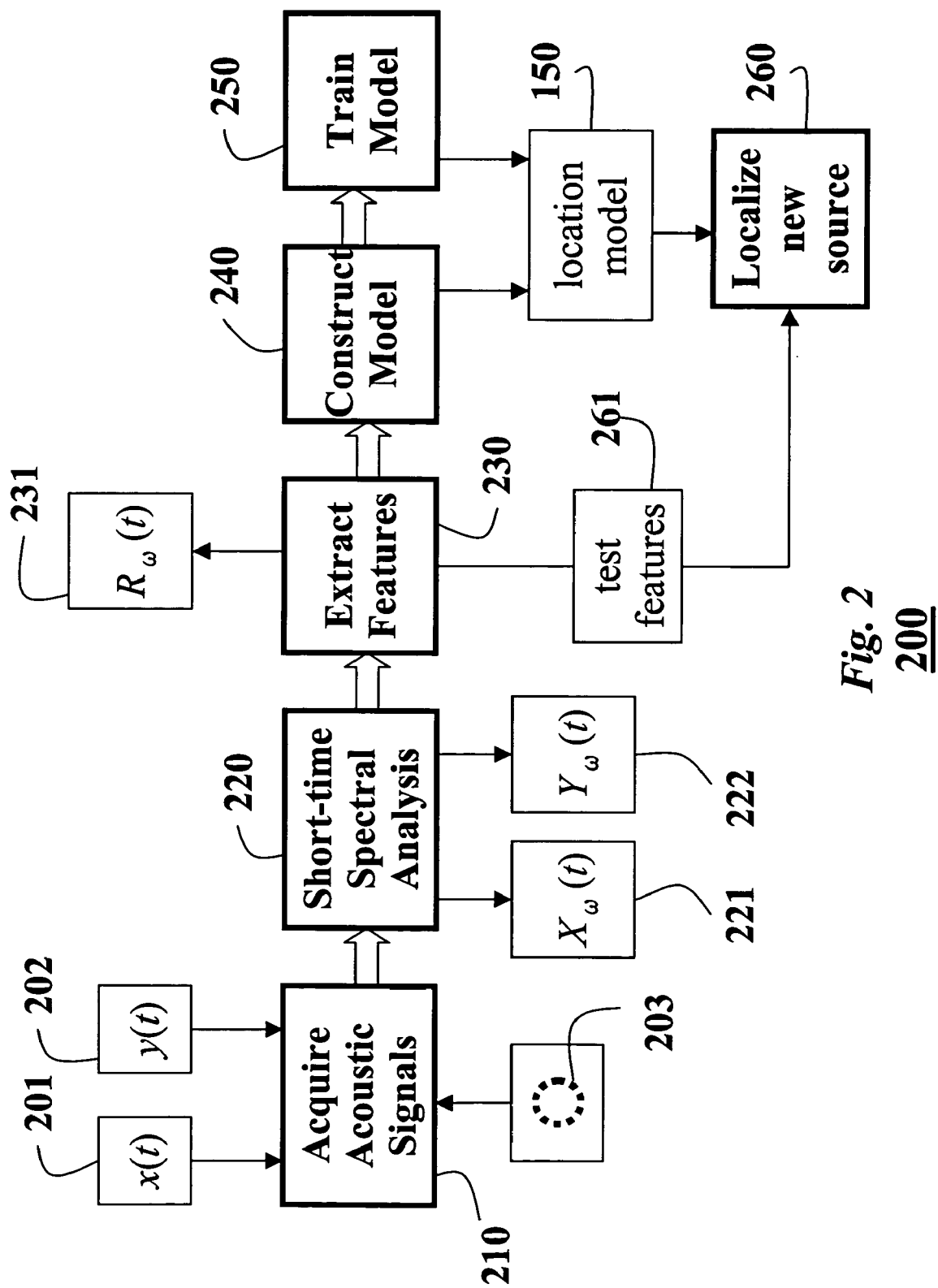
FIG. 2 is a flow diagram of a method for locating and tracking acoustic sources according to the invention.

FIG. 2 shows a method 200 for locating and tracking acoustic sources. Using the example two microphones, we acquire 210 one acoustic training signal from each microphone, denoted respectively by x(t) 201 and y(t) 202. Assuming local stationarity, we perform 220 short-time spectral analyses to determine frequency domain counterparts for the signals 201-202, which we denote as $X_\omega(t)$ 221 and $Y_\omega(t)$ 222 for each frequency ω at time t.

For features R 231, we use a log-cross-magnitude and the cross-phase of the two signals. Both features can be determined 230 using one complex logarithm:

$$R_\omega(t) = \log(X_\omega(t)/Y_\omega(t)). \quad (1)$$

This computation places the logarithm of a ratio of the magnitudes of the input signals in the real part of R and their phase difference in the imaginary part:

$$\Re(R_\omega(t)) = \|X_\omega(t)\|/\|Y_\omega(t)\|, \text{ and}$$

$$\Im(R_\omega(t)) = \angle X_\omega(t) \cdot Y_\omega(t)^*. \quad (2)$$

The information contained across all features $R_\omega$ is usually sufficient to discriminate between various source locations around the array of microphones.

The positioning and directionality response of the microphones are the main factors shaping the discrimination of the array. If the positions of the microphones are appropriately selected, then it is possible to localize a very wide range of sources locations using only a small number of microphones.

Location Model

Using the features R 231, we construct 240 the location model 150 and train 250 the model. Subsequently, the location model 150 can be used to locate and track 260 a new source 203 of acoustic 'test' signals placed in the environment 120. The test signal is processed by steps 210, 220, and 230, and the test features 261 are compared with the model to locate the source 203.

A rudimentary model would estimate a complex Gaussian distribution for each $R_\omega$ and use that for subsequent classification. However, this approximation is not always appropriate. Although the real part of our features can be adequately modeled by a Gaussian distribution, this is not the case with the imaginary part, which represents a phase value. Phase is estimated in a wrapped form and is bound between $-\pi$ and $+\pi$.

Using a Gaussian distribution to model this data can result in significant estimation errors. To illustrate this issue consider the following example from a recording of speech by two microphones.

Figure 3:
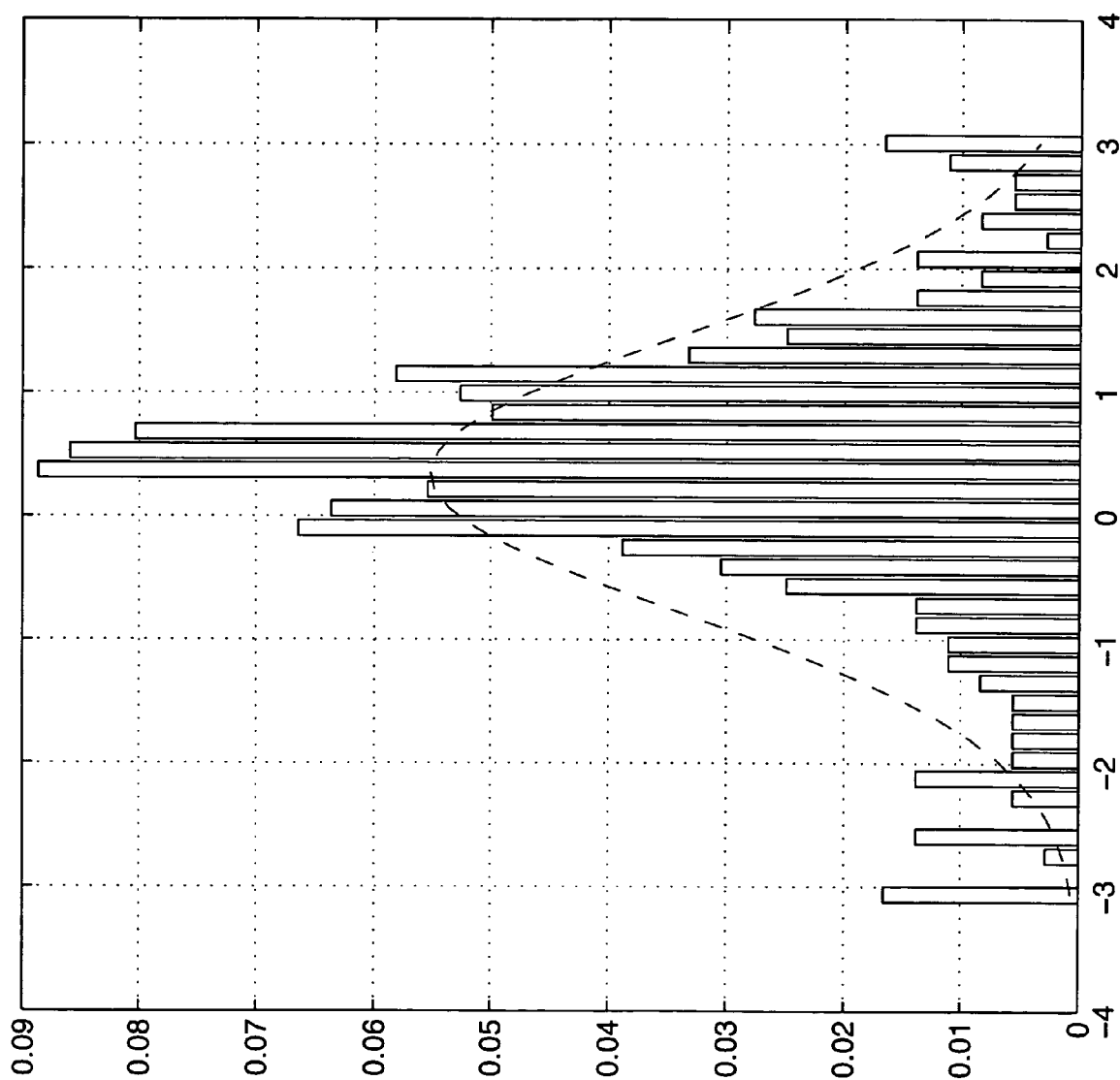
FIG. 3 is a histogram of relative phase estimates.

FIG. 3 shows a histogram of relative phase estimates around 6300 Hz. We can see that the phase estimates can be adequately modeled using a Gaussian model.

Figure 4:
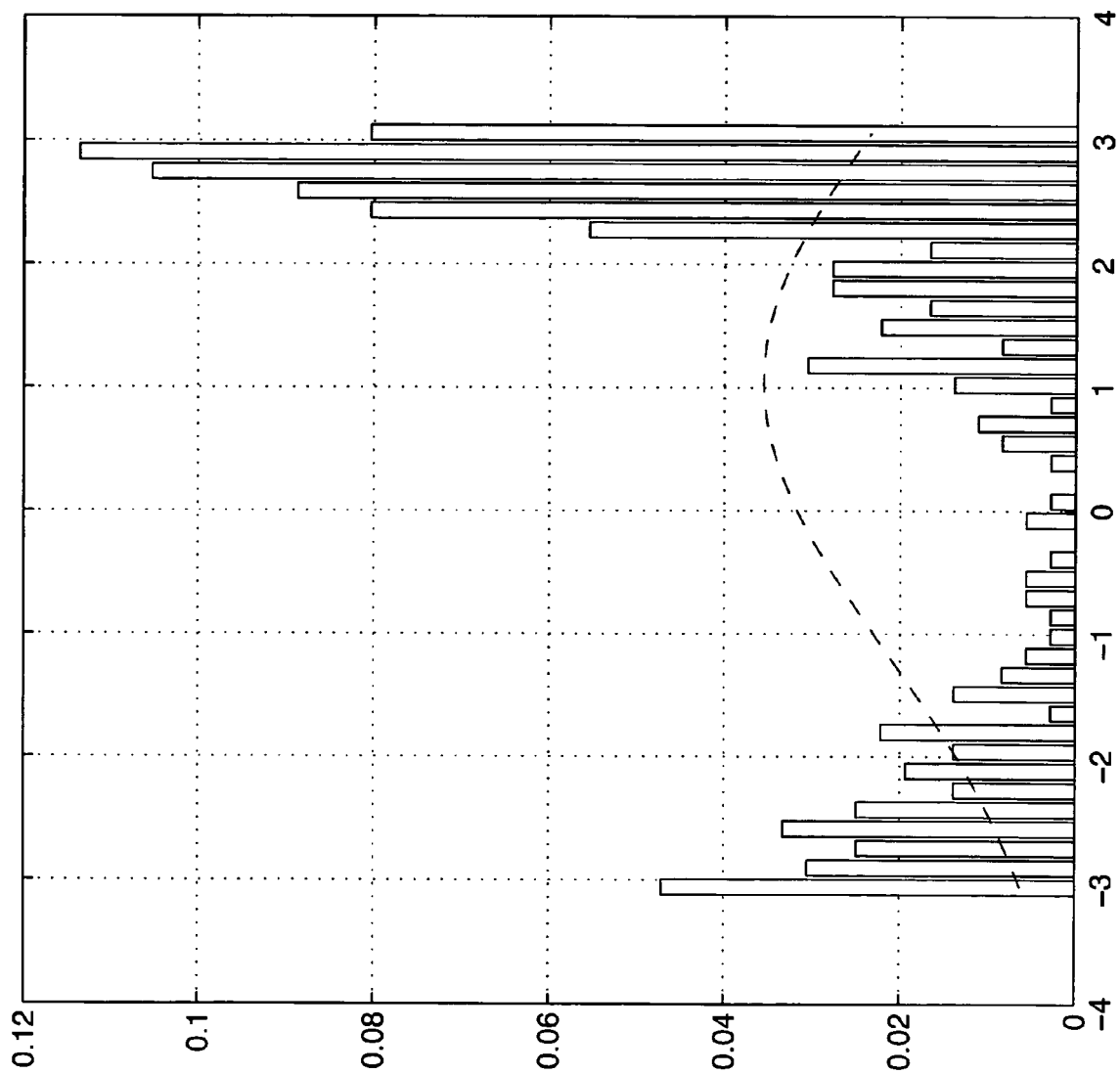
FIG. 4 is a histogram of relative phase distribution.

FIG. 4 shows a histogram of relative phase distribution with a mean at around 7800 Hz. Due to the phase wrapped around $\pm\pi$, the result is a bimodal distribution that is poorly fit by a Gaussian distribution. Even when the wrapping effect is not that severe, the mean of the estimated distributions will be biased towards zero.

Therefore, we need to consider a different location model for the phase angle, which estimates likelihoods with better accuracy. We model the distribution of the relative phase as a Gaussian distribution wrapped in the interval $[-\pi, \pi]$ $$P_{R_\omega}(x) = \begin{cases} \sum_{k \in Z} \frac{1}{\pi \sigma^2} e^{-\frac{(x-\mu+k2\pi)^2}{\sigma^2}} & x \in [-\pi, \pi] \\ 0 & \text{otherwise} \end{cases} \quad (3)$$

Ideally, the value k should range from $-1$ to $1$. In practice, a range from $-4$ to $4$ is an adequate approximation.

Figure 5:
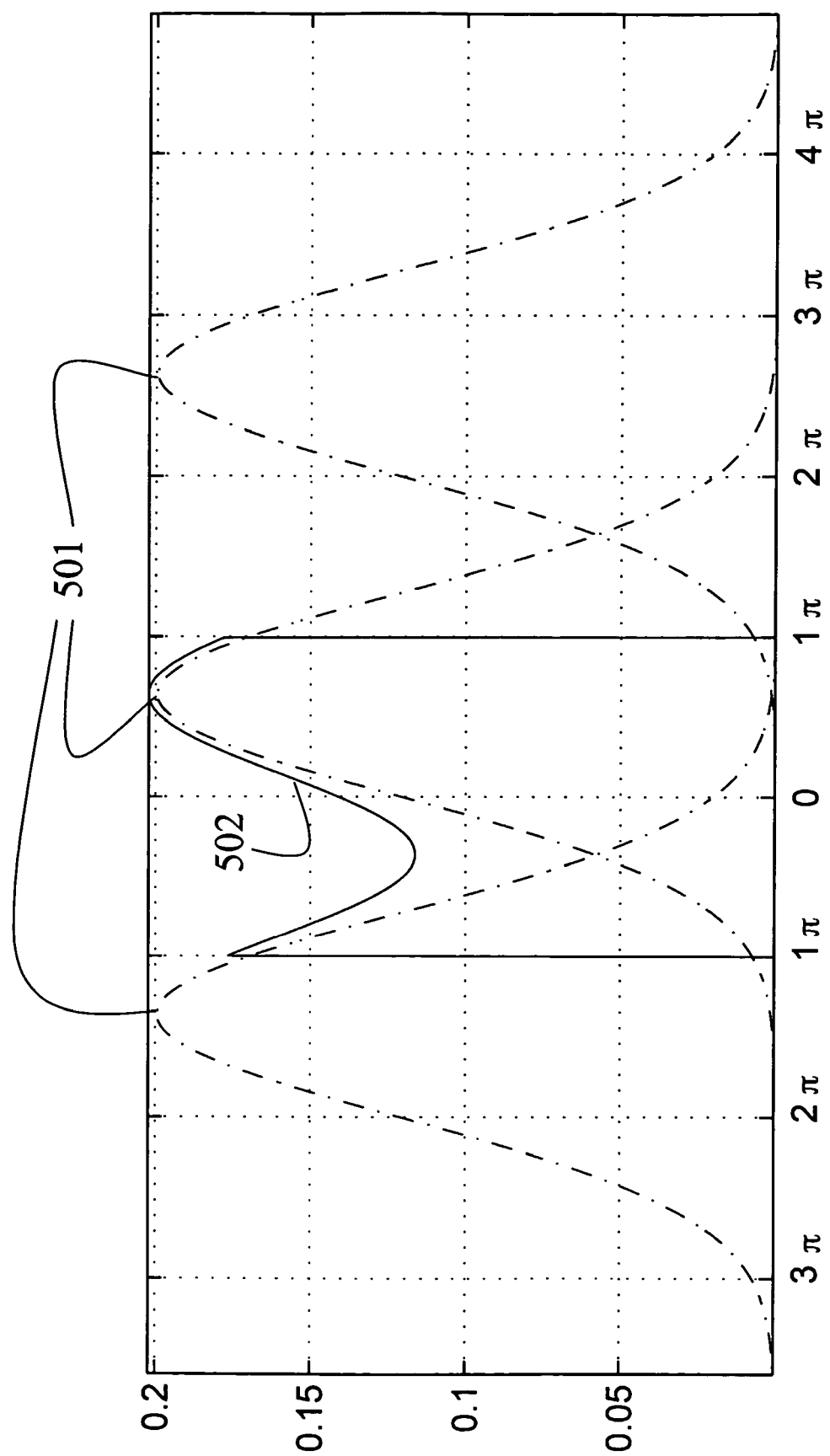
FIG. 5 is a graph of a location model according to the invention.

FIG. 5 shows how our location model works. Assuming the same data as shown in FIG. 4, we use $k \in [-1, 1]$ to obtain three Gaussian distributions, which are shown with the dashed lines 501. The solid line 502 shows the approximation of these three distributions. It can be seen that this model is much better than a single Gaussian distribution.

We now describe a process for constructing 240 the complex Gaussian location model 150 in which the imaginary part is wrapped in the interval $[-\pi, \pi]$, and the real part is not. We treat the sum of the Gaussian distributions in the imaginary domain as a constrained Gaussian mixture and adapt the parameters accordingly.

Figure 6:
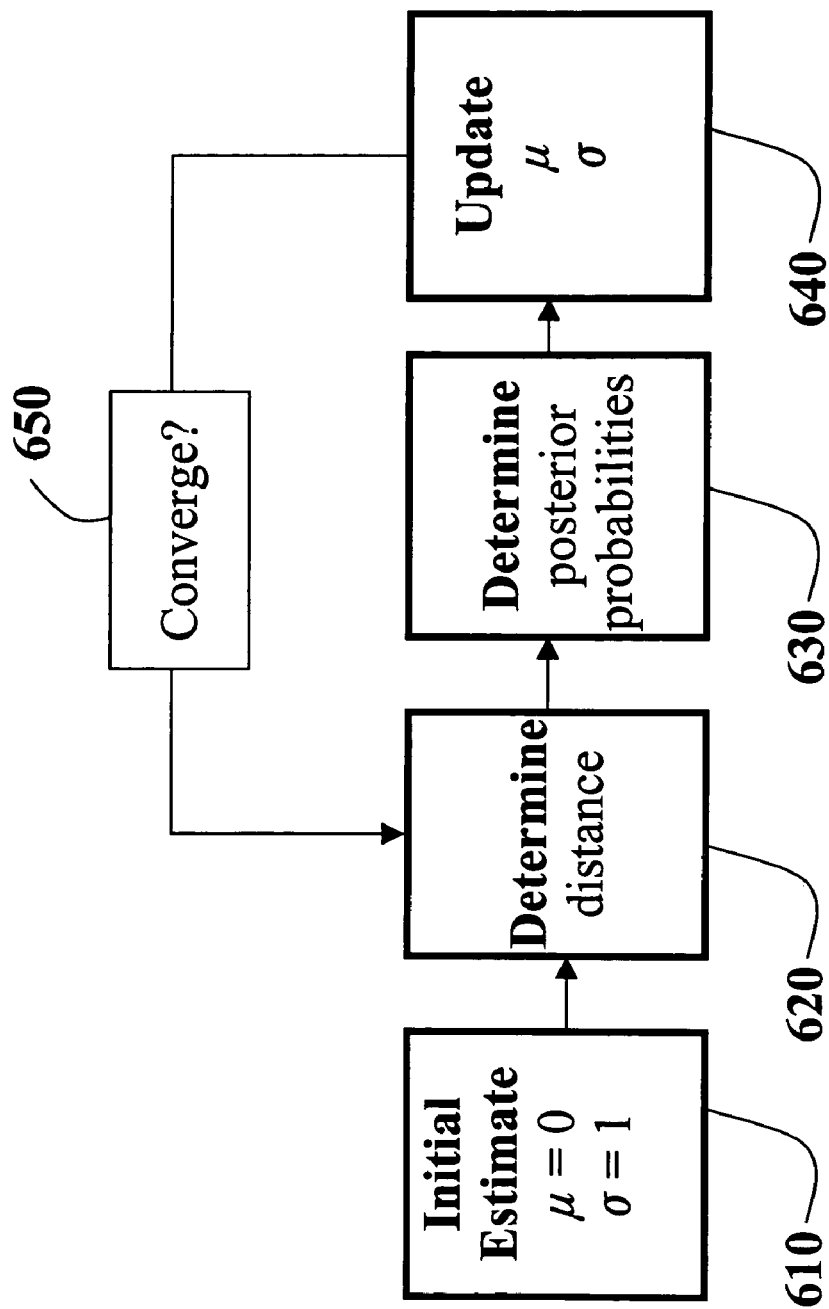
FIG. 6 is a flow diagram of a method for constructing a location model according to the invention.

As shown in FIG. 6, we determine the mean µ and variance $\sigma^2$ of our location model 150 using an expectation-maximization (EM) process. Therefore, having a complex random variable $x \in C$, we use the following steps to iteratively update the mean and variance.

Start 610 with initial estimates µ=0 and σ=1. Determine 620 the distance of the sample set from the unwrapped Gaussian distributions using:

$$D_k(x) = x - \mu + ki2\pi. \quad (4)$$

Determine 630 the posterior probabilities of the sample set for each unwrapped Gaussian distribution using:

$$Q_k(x) = \frac{1}{\pi \sigma^2} e^{-\frac{D_k(x)^2}{\sigma^2}} \quad (5)$$

$$P_k(x) = \frac{Q_k(x)}{\sum_k Q_k(x)}$$

Update 640 the variable µ as a mean weighed by the posteriors:

$$\mu \leftarrow \mu + \left\langle \sum_k D_k(x) P_k(x) \right\rangle, \quad (6)$$

where $\langle . \rangle$ denotes sample expectation. Furthermore, ensure that the imaginary part is wrapped around $[-\pi, \pi]$ by setting:

$$\Im(\mu) \leftarrow [(\Im(\mu) + \pi) \bmod (2\pi)] - \pi, \quad (7)$$

and update the variable σ using:

$$\sigma \leftarrow \sqrt{\left\langle \sum_k D_k(x)^2 P_k(x) \right\rangle}. \quad (8)$$

Repeat 650 from to step 620 until convergence.

Convergence usually concludes to a satisfactory solution by the $10^{th}$ iteration. For numerical reasons, it is best if step 630 is performed in the logarithmic domain to reduce underflow effects due to the product operation.

Training for Location

The steps for training 250 the model 150 for a particular source location is straightforward. During the training, the features from the training signal at each location are extracted using estimates of $R_\omega(t)$ 231 by applying Equation (1) on the short time Fourier transforms of the microphone input signals.

For each location, we construct the model at each frequency ω, and obtain a data series of $\mu_\omega$ and $\sigma_\omega$. To localize 260 the unknown source 203, we extract the features as described above, from the testing signal emanating from the source, and evaluate a likelihood of the trained models for each location using:

$$P(x) = \prod_\omega \sum_k \frac{1}{\pi\sigma_\omega^2} e^{-\frac{(x_\omega - \mu_\omega + k2\pi)^2}{\sigma_\omega^2}} \qquad (9)$$

The location model that provides the highest likelihood corresponds to the most probable location for the source 203.

One issue with our approach is the spectral consistency between training and testing signals. An estimate of the features $R_\omega$, can be unreliable when the source used for training has little energy at a particular frequency ω. If that is the case, then the performance can be decreased because the signal is contrasted with excessively noisy data.

To remedy this, we track the frequency content of the training data and perform classification by evaluating Equation (9) on only a few of the most prominent frequencies ω. This also provides a computational advantage because fewer operations are required for the classification. To obtain a good classification estimate, it is also important that the spectrum of the training source and the spectrum of the source to be classified have non-negligible energy in overlapping spectral areas. This constraint can be satisfied by selecting, for the training source haze, either a wideband signal or a spectrum similar to the source to be classified.

Training for Trajectories

To train for trajectories, we need to have temporal knowledge of the locations through which the source passed. A straightforward method that includes temporal information uses a hidden Markov model and Viterbi training.

As described above, we extract the features at each time point, and model each state with the location model. The model is incorporated in a Viterbi training loop to 'learn' and 'recognize' sequences of locations as described below.

Figure 7:
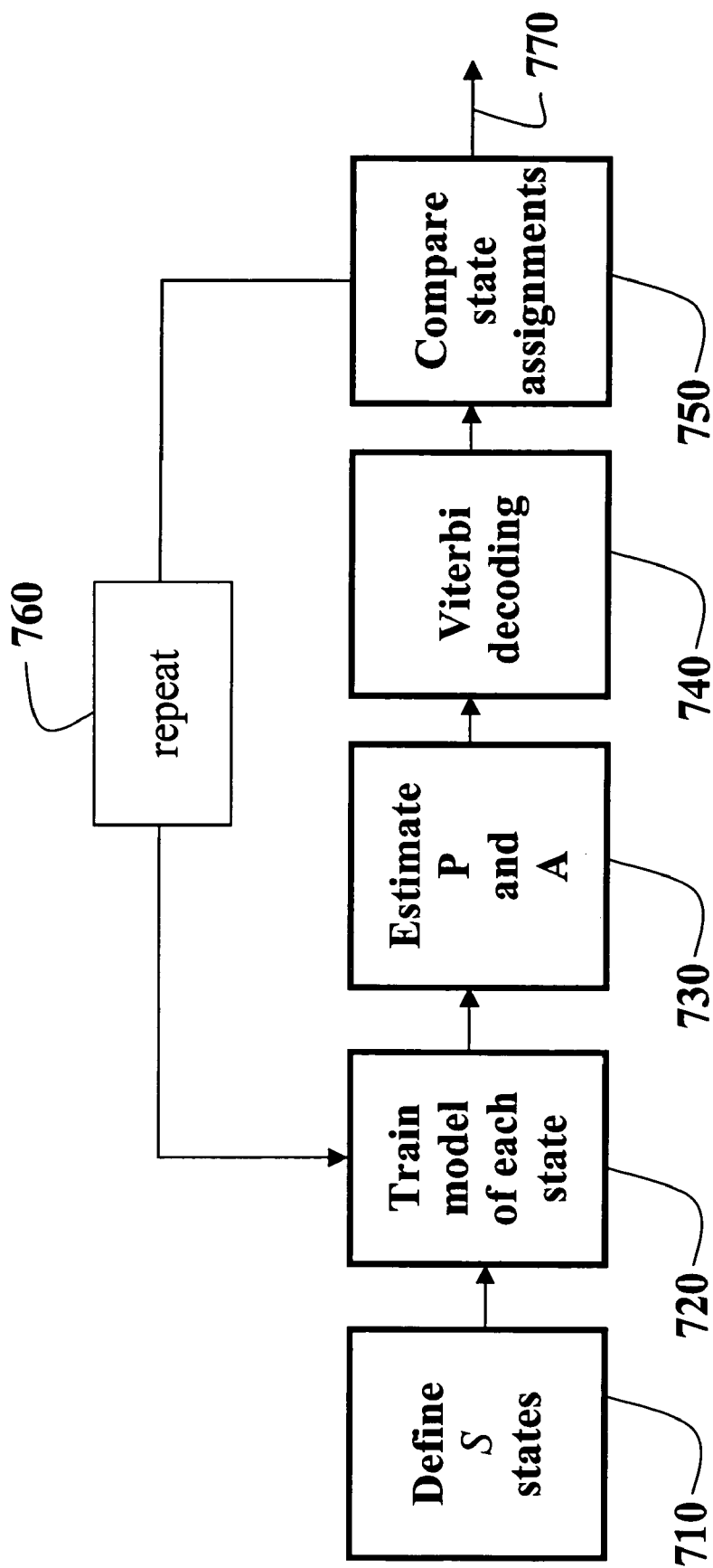
FIG. 7 is a flow diagram of a method for training the location model according to the invention.

As shown in FIG. 7, we define 710 S states to use for describing a training trajectory and assign each time point to a random state. Then, we train 720 the model of each state using the features of the time points, as described above.

Estimate 730 an initial probability vector P and a probability of a transition matrix A between states. The probability that state i will be the first to appear is $P_i$, and the probability that state i will be succeeded by state j is $A_{ij}$. Their estimation is performed in a straightforward manner by noting the initial states, and then, counting subsequent state transitions.

Use the vector P and the matrix A for Viterbi decoding 740, in conjunction with the state models, to find the most likely state of each time point in the training data.

Compare 750 state assignments. If the most likely state assignments differ from the states we had from before, then repeat 760 and go to step 720. Otherwise, terminate 770 training and return the vector P and the matrix A, and the state models.

After we obtain a set of state models and the initial and transition probabilities P and A, we can use Viterbi decoding on an arbitrary input signal to estimate its similarity to the trained sequences, thus performing classification with respect to trained models.

EFFECT OF THE INVENTION

The invention constructs a statistical location model. The model is trained with magnitude and phase response features extracted from acoustic signals emanating from source at unknown locations. The signals are acquired by microphones at unknown positions. The trained model can be used to locate and track an unknown acoustic source.

As an advantage, the invention does not require calibrated microphones, and the invention can operate in an environment where there are strong reflections, and where there is constant background noise.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A computer implemented method for constructing a location model, the location model for locating and tracking sources of acoustic signals, comprising a processor for performing steps of the method, comprising the steps of:
    acquiring, with an array of microphones placed at unknown positions in an environment, an acoustic training signal from an acoustic training source at an unknown location in the environment, each microphone acquiring one acoustic training signal;
    extracting, from each acoustic training signal, relative acoustic features;
    constructing a location model, in which a mean μ and variance $\sigma^2$ of the location model is determined using an expectation-maximization process; and
    training the location model with the relative acoustic features.

2. The method of claim 1, in which the relative acoustic features include a relative magnitude and phase of a spectrum of each acoustic training signal.

3. The method of claim 1, in which a first acoustic training signal is x(t) and a second acoustic training signal is y(t), and further comprising:
    performing, for each acoustic training signal, short-time spectral analyses to determine frequency domain counterparts $X_\omega(t)$ and $Y_\omega(t)$, respectively, for each frequency ω at time t.

4. The method of claim 3, in which the relative acoustic features are complex numbers $R_{107}(t) = \log(X_\omega(t)/Y_{107}(t))$ having a real part $$\Re(R_\omega(t)) = \|X_\omega(t)\|/\|Y_\omega(t)\|$$

representing a ratio of magnitudes of the first and second acoustic training signals, and, an imaginary part $$\angle(R_\omega(t)) = \angle X_\omega(t) \cdot Y_\omega(t)^*$$

a phase difference of the first and second acoustic training signals.

5. The method of claim 4, in which the phase difference is modeled by a Gaussian distribution wrapped in an interval [−π, π].

6. The method of claim 1, further comprising:
    acquiring, with the array of microphones placed at the unknown positions in the environment, an acoustic testing signal from an acoustic testing source at an unknown location in the environment, each microphone acquiring one acoustic testing signal;
    extracting, from each acoustic testing signal, the relative acoustic features; and
    evaluating the relative acoustic features of the acoustic testing signal to determine a likelihood of a location of the acoustic testing source.

7. The method of claim 6, further comprising:
    determining likelihoods of trajectories of the acoustic testing source using the location model.

8. The method of claim 1, in which the microphones have different response characteristics.

* * * * *